Oct. 10, 1961 J. SROFE 3,003,620
MERCHANDISING DEVICE
Filed July 8, 1960 8 Sheets-Sheet 1

INVENTOR.
JESSE SROFE.
BY
Willard S. Grover
ATTORNEY.

Oct. 10, 1961 J. SROFE 3,003,620

MERCHANDISING DEVICE

Filed July 8, 1960 8 Sheets-Sheet 2

INVENTOR.
JESSE SROFE.
BY Willard S. Grove
ATTORNEY.

MERCHANDISING DEVICE

Filed July 8, 1960

INVENTOR.
JESSE SROFE
BY
William S. Grown
ATTORNEY

MERCHANDISING DEVICE

Filed July 8, 1960 8 Sheets-Sheet 4

INVENTOR.
JESSE SROFE
BY
Willard S. Grover
ATTORNEY

INVENTOR.
JESSE SROFE
BY
Willard S. Grover
ATTORNEY

MERCHANDISING DEVICE

Filed July 8, 1960

INVENTOR.
JESSE SROFE
BY
Willard S. Grower
ATTORNEY

INVENTOR.
JESSE SROFE
BY
Wallace S. Greene
ATTORNEY

INVENTOR.
JESSE SROFE
BY
William S. Gr[illegible]
ATTORNEY

United States Patent Office 3,003,620

Patented Oct. 10, 1961

3,003,620
MERCHANDISING DEVICE

Jesse Srofe, 3385 Ault View Ave., Cincinnati 8, Ohio

Filed July 8, 1960, Ser. No. 41,514
11 Claims. (Cl. 206—45.14)

This invention pertains to improvements in merchandising devices and is particularly directed to a package receiving merchandiser adapted both to support the goods in transit and to provide an effective display holder for the goods when placed on sale.

This application is a continuation-in-part of abandoned application Serial No. 608,813, filed September 10, 1956, now abandoned, and application Serial No. 710,036, filed January 20, 1958, now Patent 2,959,276, dated November 8, 1960.

One of the objects of this invention is to provide a merchandising device which can be made from a single flat sheet of cardboard which can be automatically folded into a sleeve and glued in a regular automatic box gluing machine.

Another object of this invention is to provide a merchandising device comprising an automatically glued sleeve which may be folded flat for economical storage and shipping of large numbers of the merchandising device with the consumption of a minimum of floor space while being readily adapted to being opened for inserting the merchandise therein.

A further object is to so construct a merchandising device as set forth above that it may be run through a regular box making production line with high efficiency in packaging in placing the merchandise in the device with a minimum of labor and time being required.

Another object is to provide a merchandising device that is readily adapted to fit or pack many bottled products or other boxed products where one or more products are to be packed and sold as gifts or for special sales.

It is also an object to provide a simple sleeve type merchandising device made from a single flat sheet in which various sized and shaped holes, creases and scorings adapt the device to fit different sized bottles and other package items in which the merchandise inserted provides the means to rigidly hold the sleeve in display position and in position for shipping the merchandise therein.

A further object is to provide a sleeve type merchandiser in which the bottles, boxes, or the product itself are securely locked and protected during shipping and which devices can be safely and easily packed in corrugated boxes and shipping containers capable of sustaining without damage rough handling in transit.

And a still further object of this invention is to provide a merchandising device which receives and rigidly locks the product securely in place as the sleeve folds to concave display position and in which the product is so held that the loaded device can be dropped, thrown and otherwise roughly handled without the product being dislodged from the display.

And it is also an object of this invention to form a merchandising device from a continuous one-piece rectangular sleeve perforated and scored in such a way as to receive and lock the product therein so as to form a concave and downwardly sloping display surface for advertising matter and printing in which the merchandise provides means to rigidly hold the sleeve in said display position.

A further feature of this invention includes a folding flap pivotally connected to the upper rear edge of the sleeve which functions as a means providing a flat horizontal top surface for the packed merchandising device to facilitate protection of the top exposed surfaces of the merchandise projecting through the downwardly sloping top display surface during shipping and which flap automatically flips to vertical position to provide a further display surface for the device when set up in display position.

Still another object of this invention is to provide in conjunction with the aforementioned merchandising device a locking mechanism interacting between the back and front portions of the device to initially hold the sleeve in caved-in display position in cooperation with the products to be packed.

And it is a further object of this invention to provide in a merchandising device as set forth above, a dowel, stick or similar member engaging between the merchandise in the device and the rear face of the intersection of the front and top of the device for locking the merchandise and the display device together in shipping and display position.

Further features and advantages of this invention will appear from a detailed description of the drawings in which.

Figures 19, 21, 22:
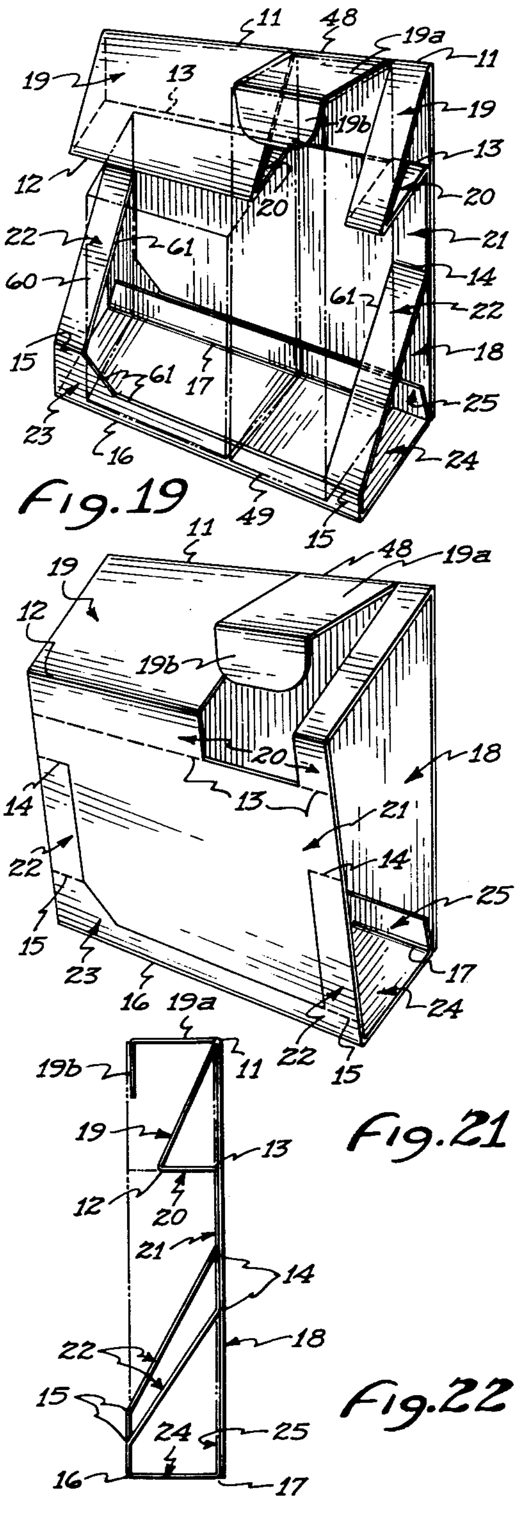
FIG. 19 is a perspective view showing a merchandising device similar to FIGS. 1, 9 and 14.
FIG. 21 is a perspective view of the device of FIG. 19 shown prior to folding and inserting the merchandise therein.
Figure 20:
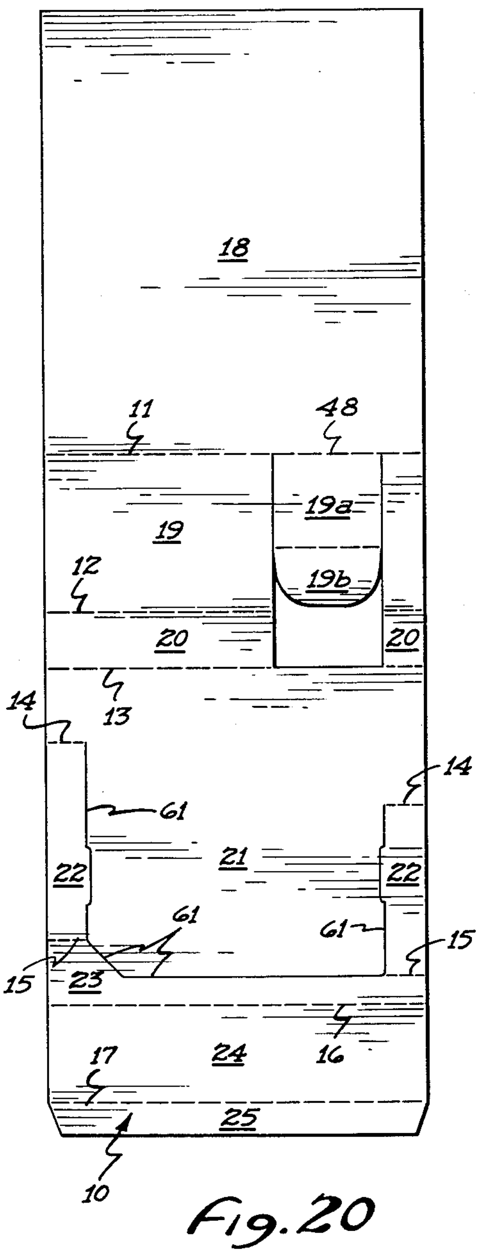
FIG. 20 is a view of the flat sheet perforated and scored preparatory to folding and gluing into the sleeve shown in FIG. 19.

FIG. 22 is an end view of the sleeve shown in FIG. 19.

Figures 1, 2, 3, 4:
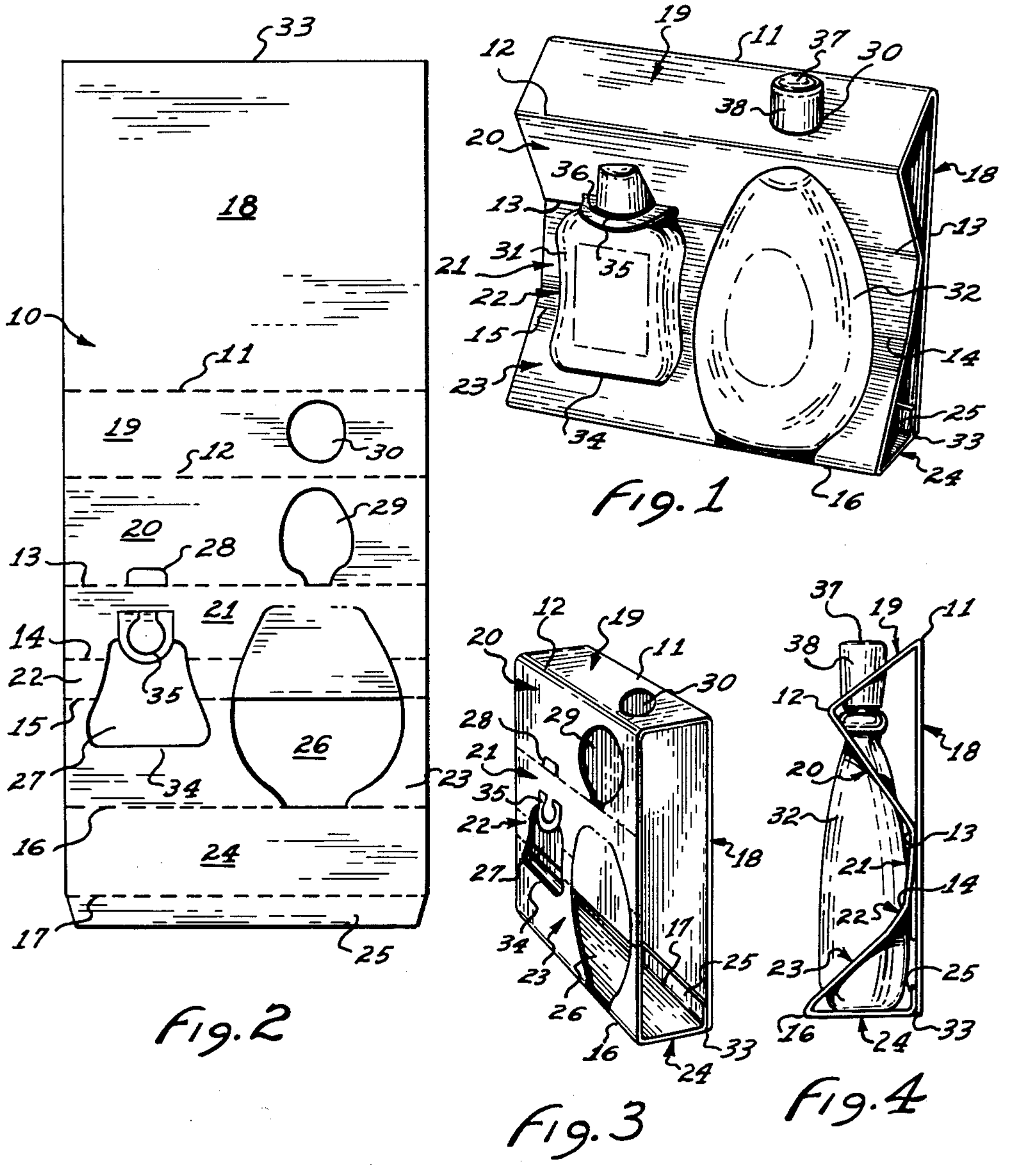
FIG. 1 is a perspective view showing a merchandising device incorporating the features of this invention.
FIG. 2 is a view of the flat sheet perforated and scored preparatory to folding and gluing into the sleeve structure of FIG. 3.
FIG. 3 is an end perspective view of the completed sleeve of FIG. 2 ready for insertion of the merchandise therein.
FIG. 4 is an end view of the sleeve with the goods packed therein.
Figure 6:
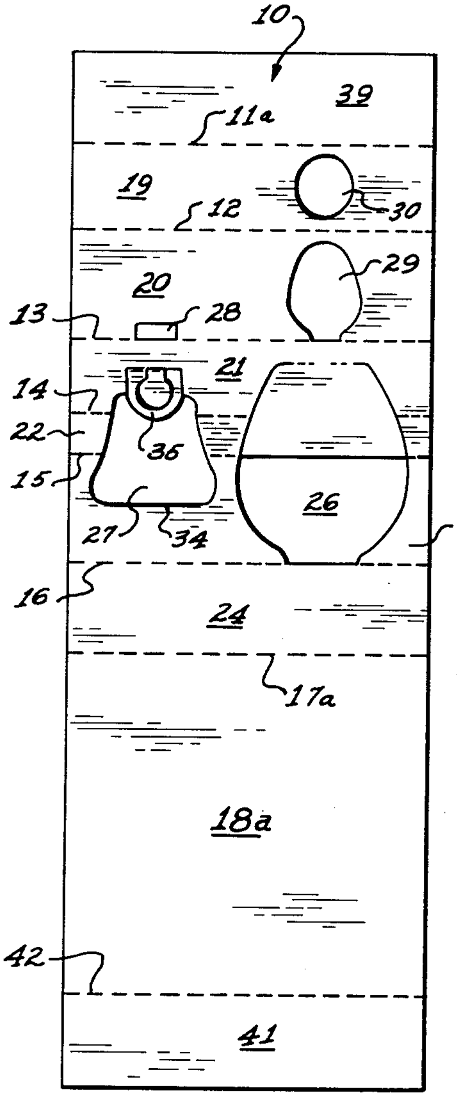
FIG. 6 is a view of the flat sheet for forming the sleeve structure shown in FIG. 5.
Figures 23, 24, 25, 26:
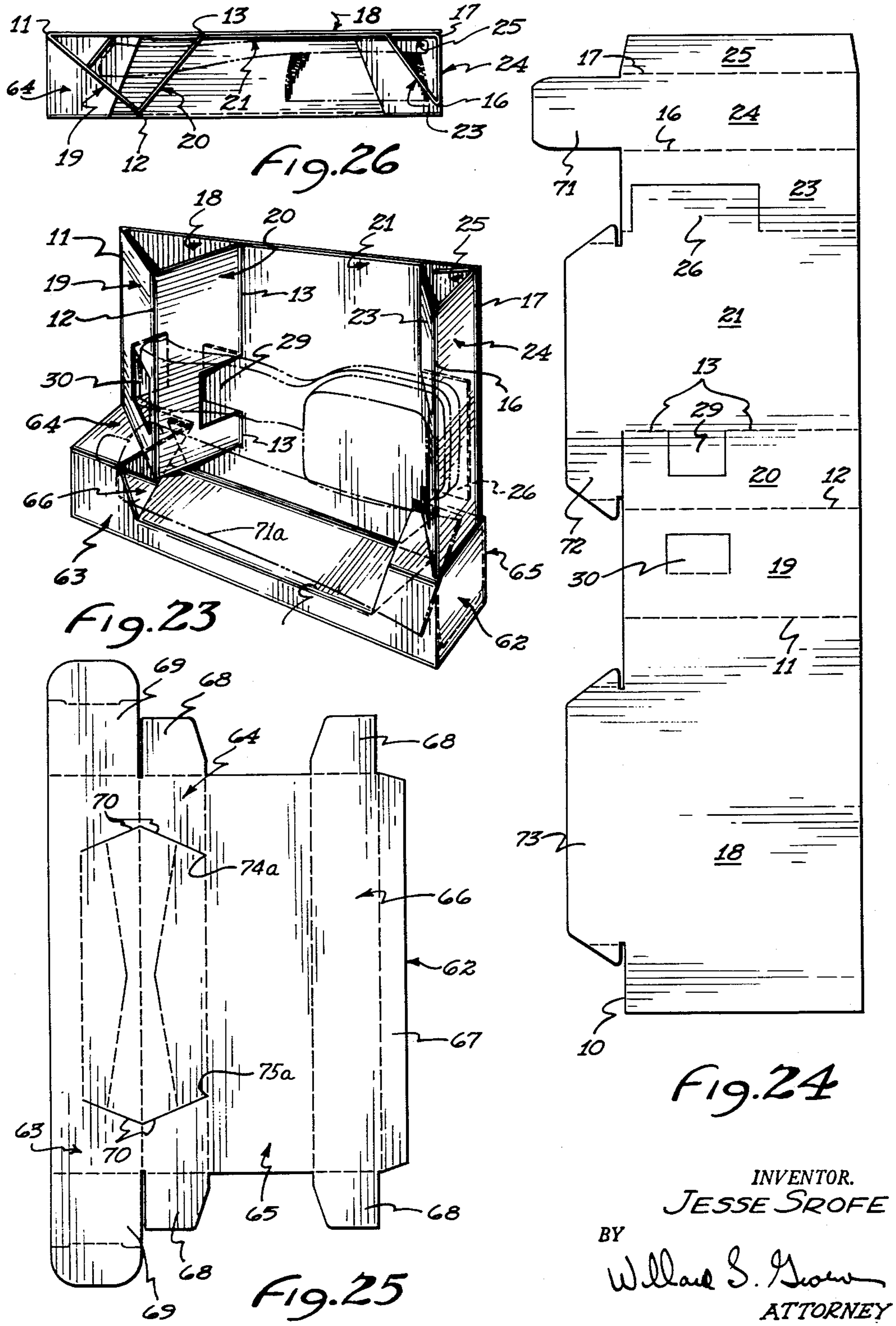

FIG. 23 is a perspective view showing a merchandising device similar to FIG. 1, but incorporated with other display devices.

FIG. 24 is a view of the flat sheet perforated and scored to form the top merchandising device of FIG. 23.

FIG. 25 is a view of the flat sheet perforated and scored to form the bottom display device.

FIG. 26 is a top plan view of the device shown in FIG. 23.

Figures 27, 28, 29, 30:
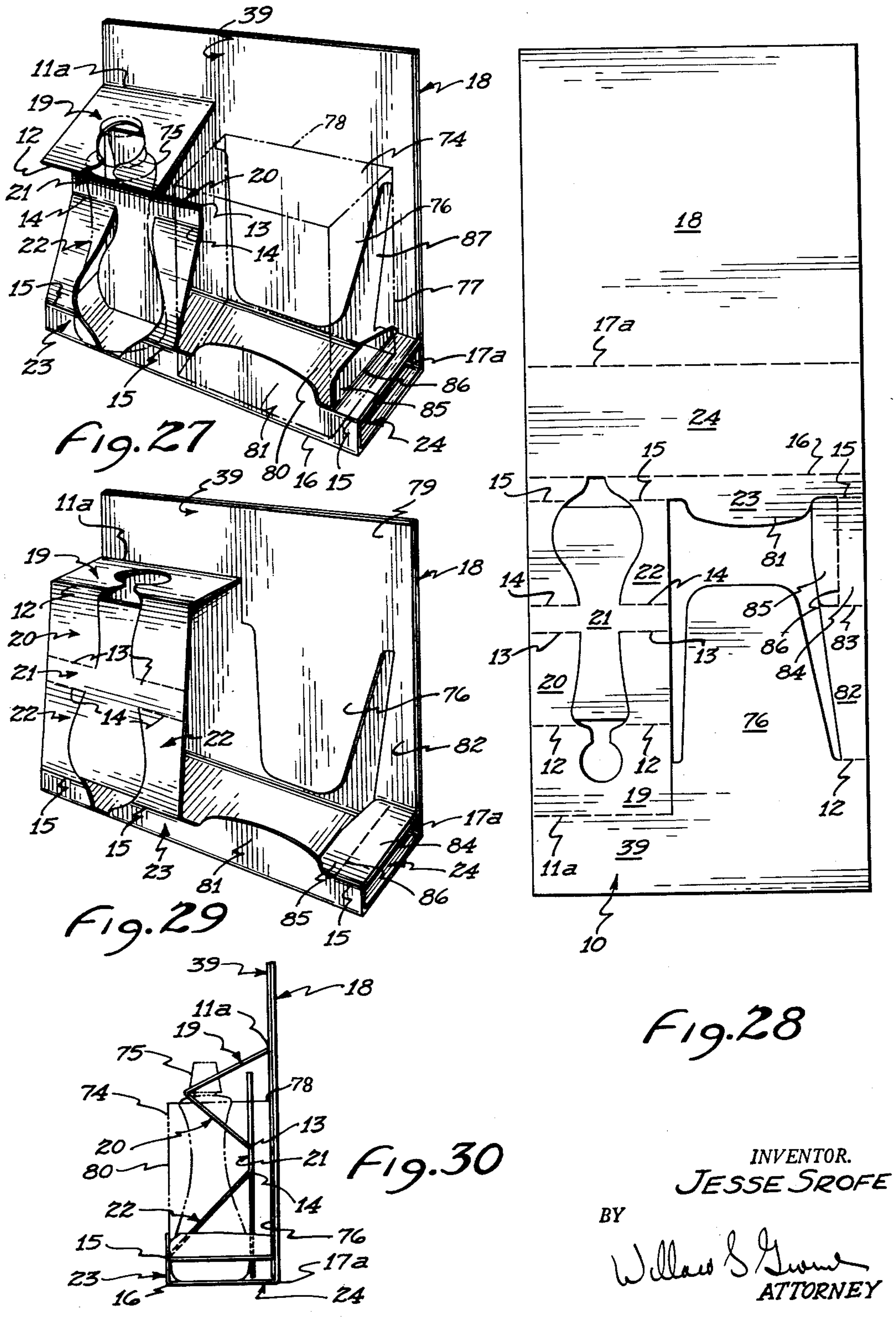

FIG. 27 is a perspective view showing a merchandising device similar to FIG. 1.

FIG. 28 is a view of the flat sheet perforated and scored preparatory to folding and gluing into the sleeve structure of FIG. 27.

FIG. 29 is a perspective view of the device of FIG. 29 prior to folding and inserting the merchandise therein.

FIG. 30 is an end view of the sleeve shown in FIG. 27.

Figure 5:
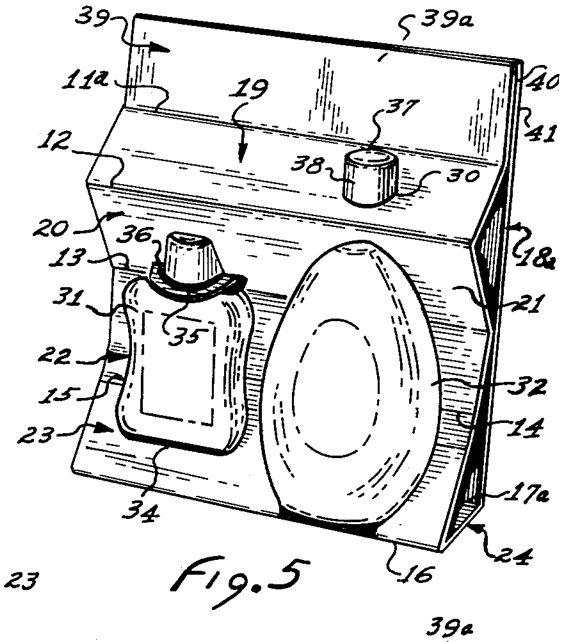
FIG. 5 is a perspective view showing a merchandising device similar to FIG. 1 but including a flip-up flap at the top rear edge of the sleeve.
Figures 31, 32, 33, 34:
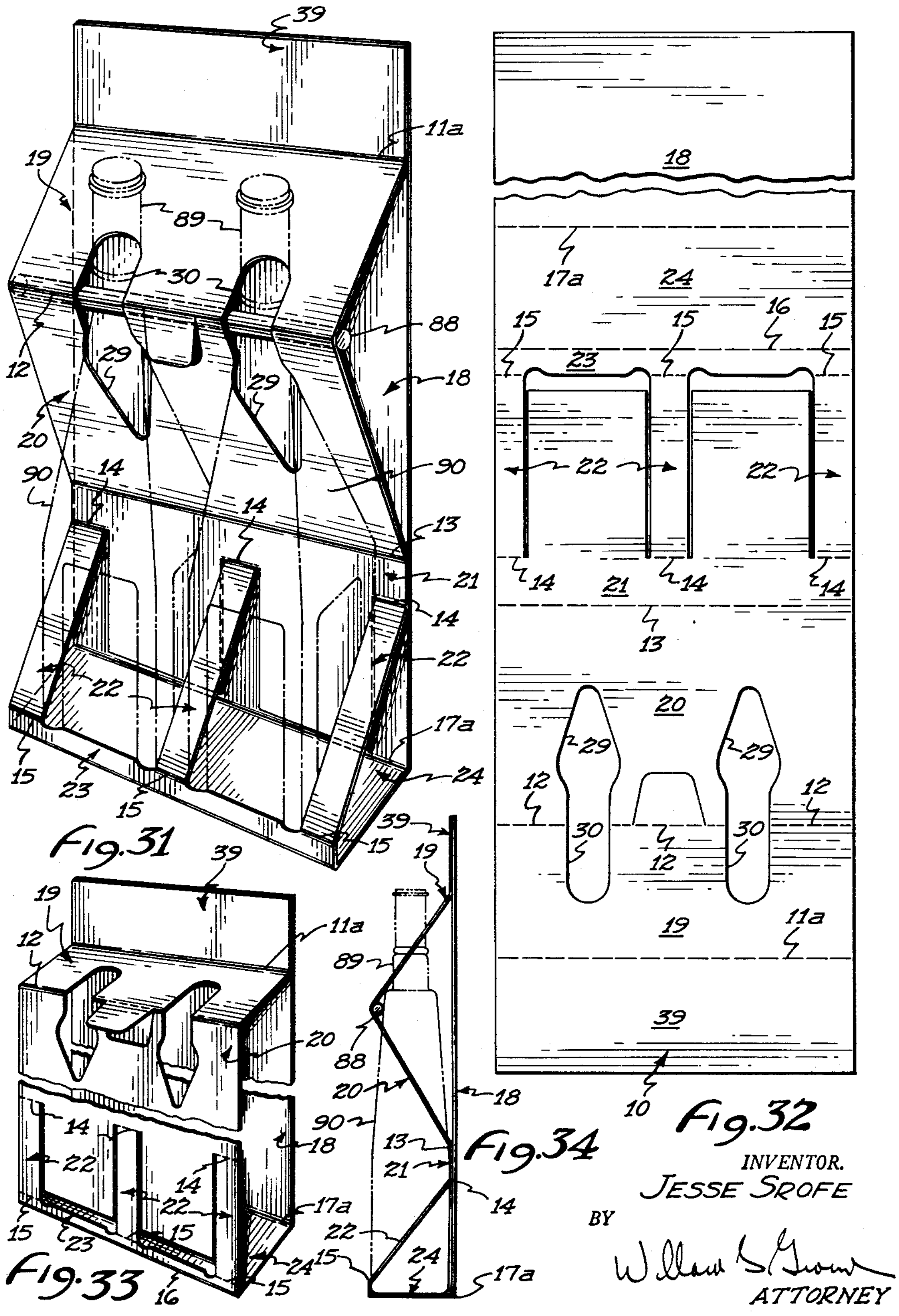

FIG. 31 is a perspective view showing a merchandising device similar to FIGS. 1 and 5, but having in addition a dowel pin locking device.

FIG. 32 is a view of the flat sheet perforated and scored preparatory to folding and gluing into the sleeve structure of FIG. 31.

FIG. 33 is a perspective view, partly broken away, showing the device of FIG. 31 prior to folding, inserting the merchandise and locking the same therein.

FIG. 34 is an end view of the sleeve shown in FIG. 31.

As an example of one embodiment of this invention there is shown in FIG. 2 a flat sheet 10 of suitable material such as cardboard or the like which is scored at 11, 12, 13, 14, 15, 16 and 17 forming the areas 18, 19, 20, 21, 22, 23, 24 and 25 on the sheet 10. The sheet 10 is perforated at 26, 27, 28, 29 and 30 to receive and rigidly lock and hold the merchandise in the form, for example, of bottles 31 and 32.

The sheet 10 thus prepared may be readily run through a regular box folding and gluing machine to form the sheet 10 into the rectangular sleeve shown in FIG. 3, preferably wherein the depth of the bottom area 24 between the scorings 16 and 17 plus the back area 18 between the scorings 11 and 17 equals the height of the front areas 20, 21, 22 and 23 between the scorings 12 and 16 plus the top area 19 between the scorings 11 and 12. The flap area 25, for example, is glued to the inner surface and along the outer edge 33 of the back area 18 of the sheet 10.

The thus prepared sleeve then has its front areas or portions 20, 21, 22 and 23 caved inwardly, FIG. 4, by the insertion of the merchandise, such as the bottles 31 and 32 which action locks the bottles in the sleeve so that they provide the means for maintaining the sleeve in display position as shown in FIG. 4. It will be noted under these conditions the top portion 19 slopes forwardly and downwardly, this sloping portion being connected foldably with the front member 20 by the continuous laterally extending scoring 12. It will be noted that when the bottle 32 is in locked in position its bottom rests on the bottom portion 24 of the sleeve while its neck, extending up behind the continuous lateral scoring 12, projects upwardly through the perforation 29 in the front area 20 of the sheet 10. The top surface 37 of the bottle cap 38 projects upwardly through the perforation 30 to the same height as the scoring 11 of the back 18 so that when the loaded sleeve, FIG. 4, is packed with others in a shipping carton no lengthwise shifting of the bottle 32 and sleeve assembly can take place resulting in prevention of damage in shipping and handling since the bottle is supported by the carton rather than by the sleeve perforations. Thus the bottle-sleeve assembly is always received in good usable condition for display and handling. It is important to note that the combination of the particularly constructed sleeve and the bottle thus locked therein forms a rigid structure, holding the sleeve in concaved and sloping display surfaces without the use of any additional fasteners, gluing or tape being required in assembly of the merchandise in the device while still providing an assembly of high rigidity to withstand rough handling and yet allowing full view of the merchandise and labels thereon.

Other items such as the smaller, lighter bottle 31 rests on the bottom portion 24 and is held by the loop piece 35 around its neck 36, the back piece 18 supporting the bottle 31 against inward movement while the edge 34 pushes inwardly against the bottle 31 holding it securely against the back panel 18, it being borne in mind that the concave front and front sloping top is held rigidly in place by the aforementioned bottle 32 locked therein as described above.

Figures 7, 8:
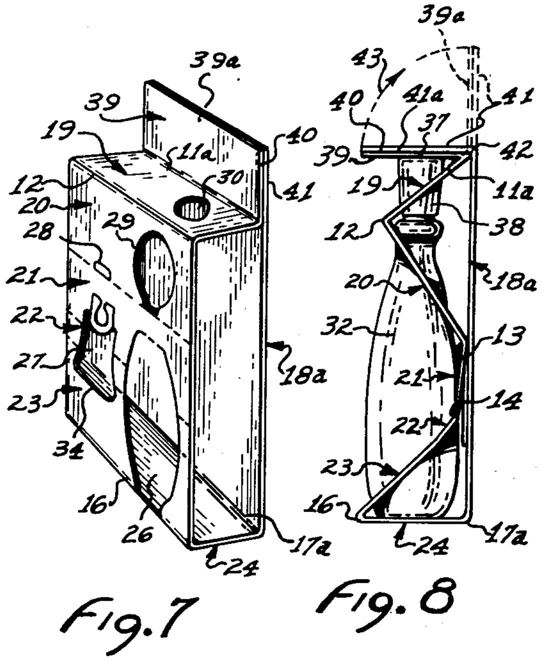
FIG. 7 is an end perspective view of the completed sleeve of FIG. 6 ready for insertion of the merchandise therein.
FIG. 8 is an end view of the sleeve of FIGS. 5, 6 and 7, with the goods packed therein.
Figures 9, 11, 12, 13:
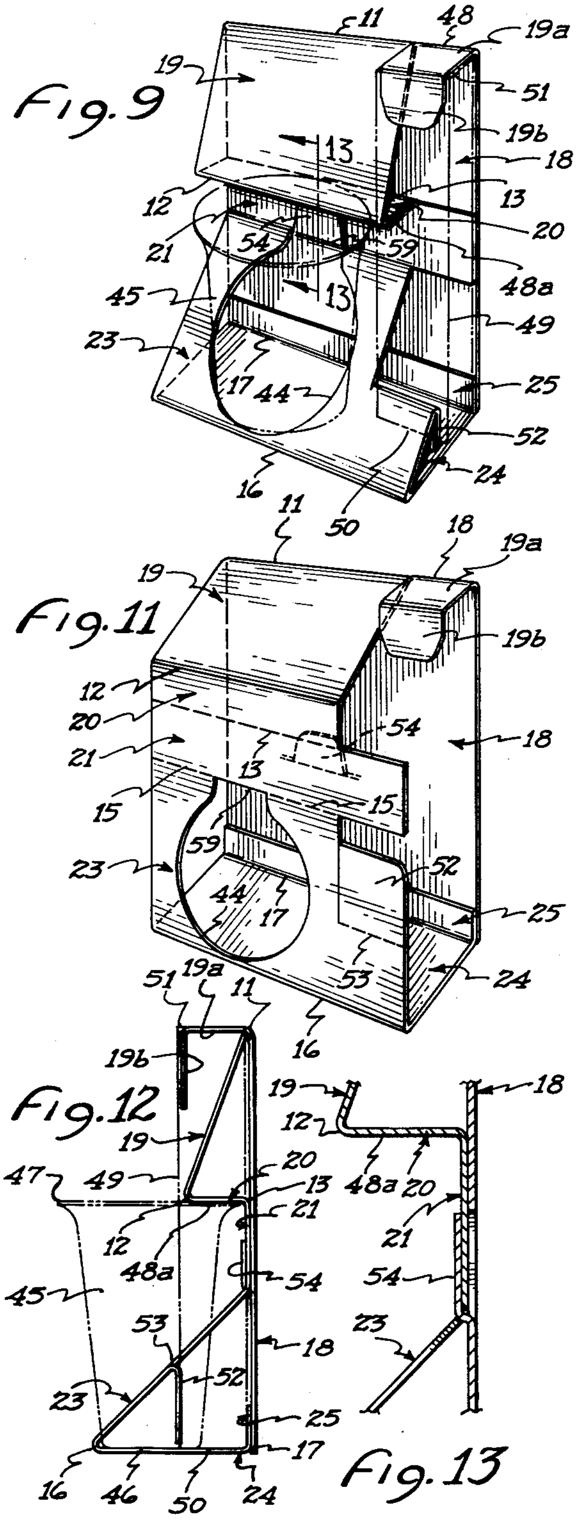
FIG. 9 is a perspective view showing a merchandising device similar to FIG. 1, but having in addition a locking device between the back and front portions of the device.
FIG. 11 is a perspective view of the device of FIG. 9 shown prior to folding, locking and inserting the merchandise therein.
FIG. 12 is an end view of the sleeve shown in FIG. 9.
FIG. 13 is an enlarged fragmentary sectional view of the locking device shown on the line 13—13 of FIG. 9.
Figure 10:
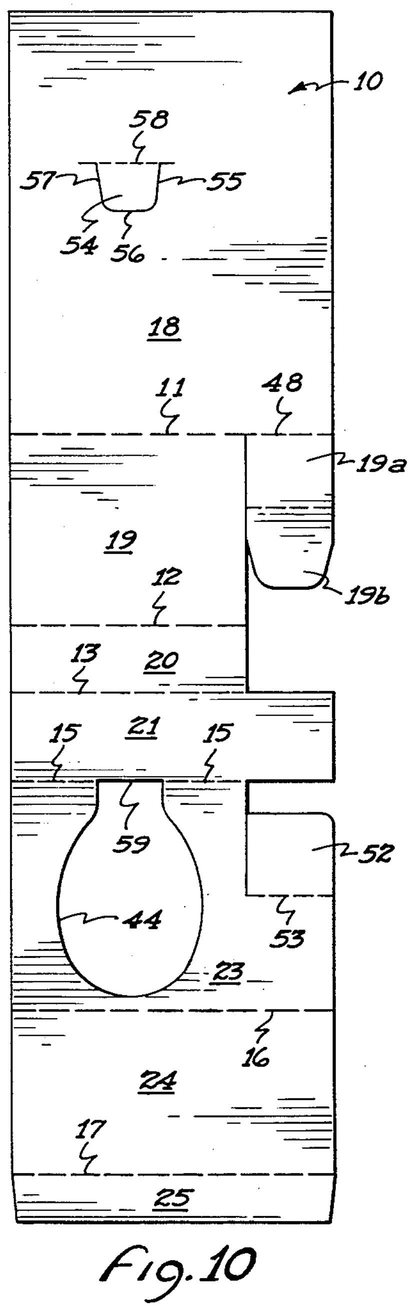
FIG. 10 is a view of the flat sheet perforated and scored preparatory to folding and gluing into the sleeve structure of FIG. 9.
Figure 14:
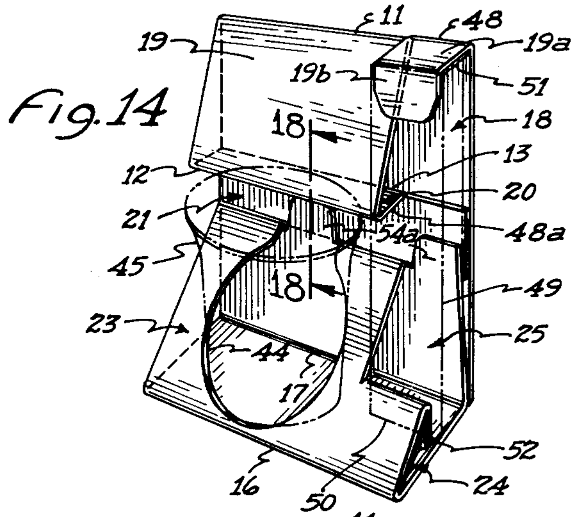
FIG. 14 is a perspective view showing a merchandising device similar to FIGS. 1 and 9.
Figure 16:
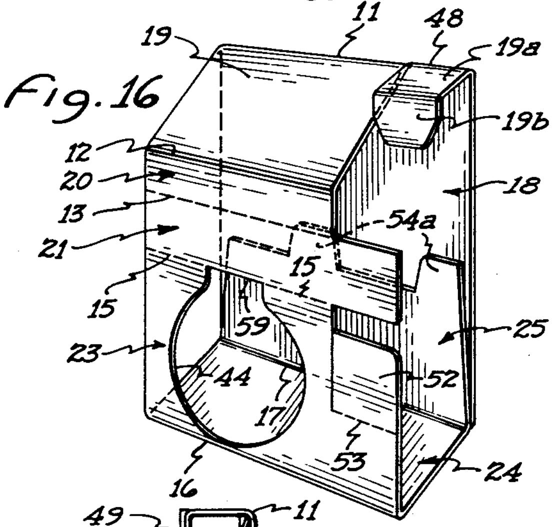
FIG. 16 is a perspective view of the device of FIG. 14 shown prior to folding, locking and inserting the merchandise therein.
Figures 17, 18:
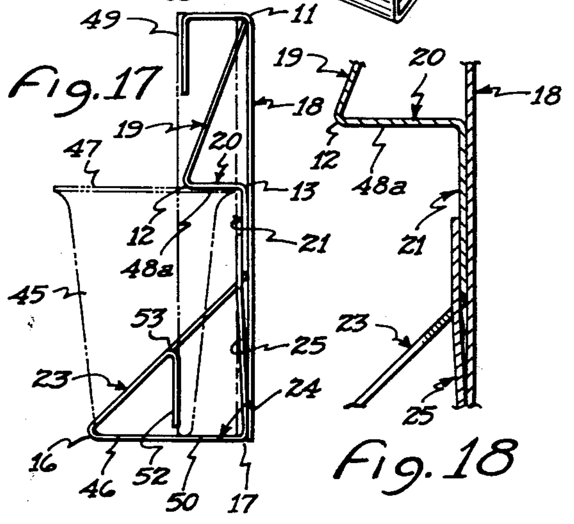
FIG. 17 is an end view of the sleeve shown in FIG. 14.
FIG. 18 is an enlarged fragmentary sectional view on the line 18—18 of FIG. 14.
Figure 15:
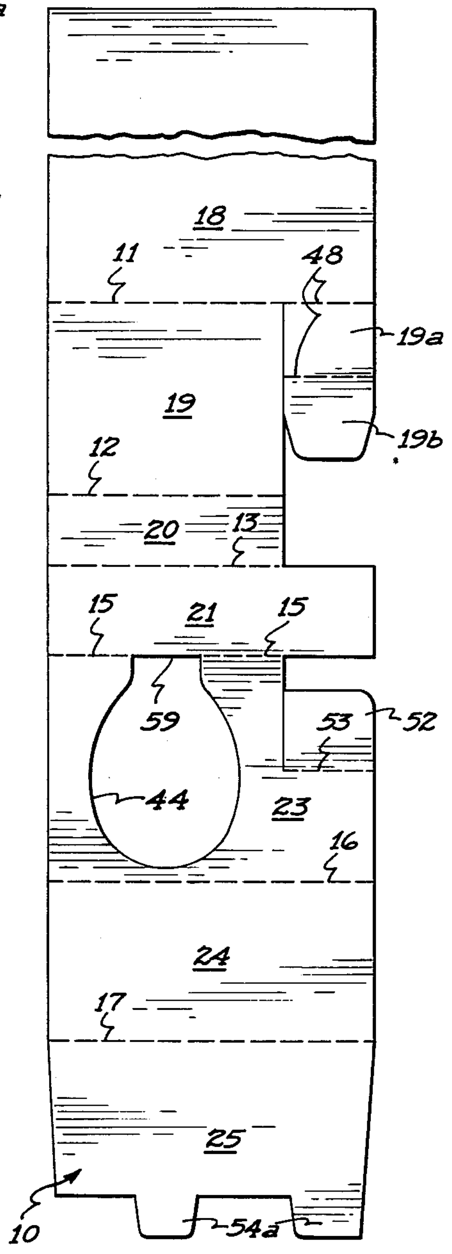
FIG. 15 is a view of the flat sheet perforated and scored preparatory to folding and gluing into the sleeve structure of FIG. 14.

In certain instances it may be desirable to provide additional display and advertising area for the front portion of the display device and further protection for the tops of the bottles and make the devices stackable held therein for better packing in shipping. To this end there is provided a display flap 39 pivotally connected at the scoring **11*a* which may be connected by the glue joint 40 with the extended portion 41 pivotally connected at the scoring 42 with the back 18*a*. The pivotal connections at the scorings 42 and 11*a* are preferably made so that the flap 39 normally flips up in the direction indicated by the arrow 43 to the vertical display position 39*a* while it may be folded over to horizontal position shown in full line in FIG. 8, engaging the top surface 37 of the cap 38 of the bottle 32 to give a flat large area surface 41*a*** to facilitate stacking and packing in shipping cartons.

In FIGS. 9 through 13, there is shown the device provided with an oval perforation 44 adapted to receive a bathroom cup or glass 45 having its bottom 46 resting on the bottom area 24 of the device and its lip 47 engaging the surface **48*a* of the front area 20 to secure the cup in the device. In this arrangement there is provided additional means for mounting an elongated rectangular box, such as a toothpaste tube carton 49, in the device comprising a flap 19*a* and 19*b* connected by scoring 48 to the top edge of the back area 18. The carton 49 has one of its ends 50 resting on the bottom area 24 while the portion 19*a* of the flap folds over the upper end 51 of the carton and the end 19*a* of the flap is tucked into the carton the same as the regular flap on the end of the carton. It will be noted that the front area portion 23 of the device is provided with a flap 52 connected to the area 23 by the scoring 53, the flap 52 being folded inwardly and downwardly to engage the front face of the carton 49** to thus secure the carton in the device.

In certain instances it may be desirable to lock the front areas in caved in position to the back 18 of the device. To this end there is provided a latch or locking device comprising a lug or tab 54 formed in the back area 18 by slitting the lines 55, 56 and 57 leaving the tab pivotally connected at the scoring 58 to the back area 18. The perforation 44 is provided with a straight edge 59 coinciding with the scoring 15 so that the front area 21 may be inserted behind the tab 54 and the straight edge 59 brought down against the scoring 58 thereof to hold the device in caved-in display position.

The structure of FIGS. 14 through 18 is identical to that described in connection with FIGS. 9 through 13. There is a plurality of tabs **54*a* provided instead of the single tab 54 attached to the back area 18. The tabs 54*a* are provided on the back by forming them on the glue flap 25 secured to the inner face of the back area 18 of the device. The front area 21 is hooked behind the tabs 54*a*** in the same manner as in FIGS. 9 through 13.

FIGS. 19 through 22 shows the same arrangement for holding the rectangular carton 49 in the device as in FIGS. 9 through 18. A box of merchandise 60 is carried in the device the same as the cup 45 by providing the cutout 61 to receive the box 60 and the carton 49 as shown. Locking devices such as 54 or 54*a*, not shown in FIGS. 19 through 22 may be optionally added to the device here shown if desired.

In FIGS. 23 to 26 inclusive is shown an arrangement where the device is turned on its side and attached to a conventional tube display carton 62 leaving the front 63, top 64, back 65, and bottom 66 secured together by the usual glue flap 67, the end flaps 68 and the closure flaps 69, FIG. 25. Slitting is provided at 70 to provide an opening exposing the tube 71*a* for display. The merchandising device is provided with auxiliary tabs 71, 72 and 73, the tabs 72 and 73 hooking into the opening between the points 74*a* and 75*a* at the slits 70 while the tab 71 inserts over the top of one of the end flaps 69 to secure the device to the carton 62. Any other suitable securing device may be utilized to secure the display device on its side to other merchandise items.

In FIGS. 27 to 30 is shown an arrangement for packaging a box item 74 along with the bottle 75 held in the usual manner of this device. In the arrangement shown the portion 19 is provided with a tongue 76 which may be pushed inside of the back 77 of the box 74 at the point 78 holding the box back against the front faces of portions 19 and 39 while the front face 80 of the box 74 is held at its lower portion behind the flap 81 of the front area portion 23 of the device. The area 82 is connected by scoring 83 to the area 84 having a flap 85 connected by scoring 86 thereto, which flap 85 may be turned up against the side 87 of the box 74.

The structure shown in FIGS. 31 through 34 further illustrates the basic arrangement of the devices shown in this application with the addition of a dowel pin 88 which is inserted behind in the top area 19 and front area 20 at the junction of these members at the scoring 12, the dowel engaging the front faces of the merchandise which in this example confuses the top portions 89 of the bottles 90 to further lock the merchandise in the display device.

While the apparatus herein disclosed and described constitutes a preferred form of the invention, it is also to be understood that the apparatus is capable of mechanical alteration without departing from the spirit of the invention and that such mechanical arrangement and commercial adaptation as fall within the scope of the appendent claims are inended to be included herein.

Having thus fully set forth and described this invention what is claimed and desired to be obtained by United States Letters Patent is:

1. An article supporting open-ended elongated display sleeve adapted to secure an item of merchandise in operative position having, an upwardly extending back panel, a forwardly extending bottom panel normal to said back panel and integral with the bottom edge thereof, a downwardly sloping top panel integral with the top edge of said back panel, a front panel integral with the front edges of said bottom panel and said top panel having a top portion extending horizontally inwardly and a bottom portion sloping inwardly toward said back panel and substantially contacting the same, said bottom portion of said front panel having openings therein extending from the front to the rear of said display sleeve, and said upper horizontal portion of said front panel and said downwardly sloping top panel having openings substantially in alignment with said openings in said bottom portion of said front panel.

2. An article supporting sleeve as set forth in claim 1 wherein means are provided for locking said front panel to said back panel at a point intermediate the top and bottom portions of said front panel.

3. An article supporting sleeve as set forth in claim 1 wherein a locking flap is formed integral with said back panel adapted to engage the top portion of merchandise in said openings.

4. An article supporting open-ended elongated display sleeve adapted to secure an item of merchandise in operative position having, an upwardly extending back panel, a forwardly extending bottom panel normal to said back panel and integral with the bottom edge thereof, a downwardly sloping top panel integral with the top edge of said back panel, a front panel integral with the front edges of said bottom panel and said top panel having a horizontally disposed top portion and a bottom portion sloping inwardly toward said back panel and substantially contacting the same, said bottom portion of said front panel having an opening therein extending from the front to the rear of said display sleeve and said upper horizontally disposed portion of said front panel downwardly engaging the surface of a merchandise item placed in said opening in said bottom portion of said front panel.

5. An article supporting open-ended elongated display sleeve adapted to secure an item of merchandise in operative position having, an upwardly extending back panel, a forwardly extending bottom panel normal to said back panel and integral with the bottom edge thereof, a downwardly sloping top panel integral with the top edge of said back panel, a front panel integral with the front edges of said bottom panel and said top panel having top and bottom portions sloping inwardly toward said back panel and substantially contacting the same, said bottom portion of said front panel having openings therein extending from the front to the rear of said display sleeve and said upper rearwardly sloping portion of said front panel and said downwardly sloping top panel having openings substantially in alignment with said openings in said bottom portion of said front panel, and a locking dowel pin extending horizontally adjacent the back of said integral connection between said top panel and said front panel and engaging an item of merchandise in said openings.

6. An article supporting open-ended display sleeve quadrilateral in vertical cross section and adapted to secure an item of merchandise in display position, said sleeve in display operative position having, a plurality of panels consisting of an upwardly extending back panel, a forwardly extending bottom panel normal to said back panel and integral with the bottom edge thereof, a downwardly sloping top panel integral with the top edge of said back panel, a front panel integral with the front edge of said top panel and the front edge of said bottom panel and having respectively top and bottom portions sloping inwardly toward said back panel and substantially contacting the same wherein the cross-sectional length of any two adjacently connected panels equals the cross-sectional length of the remaining panels to provide for folding flat said quadrilateral display sleeve in which said bottom portion of said front panel is arranged with openings therein extending from the front to the rear of said display sleeve and said upper rearwardly sloping portion of said front panel and said downwardly sloping top panel are arranged with openings substantially in alignment with said openings in said bottom portion of said front panel.

7. An article supporting open-ended elongated display sleeve as set forth in claim 6 wherein there is provided a display flap pivotally connected to the top edge of said back panel and the rear edge of said sloping top panel adapted to be swung from a horizontal position over said sloping top panel to a vertical position in plane with said back panel.

8. An article supporting open-ended display sleeve quadrilateral in vertical cross section and adapted to secure an item of merchandise in display position, said sleeve in display operative position having, an upwardly extending back panel, a forwardly extending bottom panel normal to said back panel and integral with the bottom edge thereof, a downwardly sloping top panel integral with the top edge of said back panel, a front panel integral with the front edge of said top panel and the front edge of said bottom panel and having respectively top and bottom portions sloping inwardly toward said back panel and substantially contacting the same wherein the height of said back panel plus the width of an adjacent connected panel equals the height of said front panel plus the other of said connected panels to provide for folding flat said quadrilateral display sleeve in which said bottom portion of said front panel is arranged with openings therein extending from the front to the rear of said display sleeve and said upper rearwardly sloping portion of said front panel and said downwardly sloping top panel are arranged with openings substantially in alignment with said openings in said bottom portion of said front panel.

9. An article supporting open-ended elongated display sleeve as set forth in claim 8 wherein there is provided a display flap pivotally connected to the top edge of said back panel and the rear edge of said sloping top panel adapted to be swung from a horizontal position over said sloping top panel to a vertical position in plane with said back panel.

10. An article supporting open-ended display sleeve quadrilateral in vertical cross section and adapted to secure an item of merchandise in display position, said sleeve in display operative position having, a plurality of panels consisting of an upwardly extending back panel, a forwardly extending bottom panel normal to said back panel and integral with the bottom edge thereof, a downwardly sloping top panel integral with the top edge of said back panel, a front panel integral with the front edge of said top panel and the front edge of said bottom panel and having respectively top and bottom portions sloping inwardly toward said back panel and substantially contacting the same wherein the height of the back panel plus the width of the bottom panel equals the height of the front panel plus the width of the top panel to provide for folding flat said quadrilateral display sleeve in which said bottom portion of said front panel is arranged with openings therein extending from the front to the rear of said display sleeve and said upper rearwardly sloping portion of said front panel and said downwardly sloping top panel are arranged with the openings substantially in alignment with said openings in said bottom portion of said front panel.

11. An article supporting open-ended display sleeve quadrilateral in vertical cross section and adapted to secure an item of merchandise in display position, said sleeve in display operative position having, an upwardly extending back panel, a forwardly extending bottom panel normal to said back panel and integral with the bottom edge thereof, a downwardly sloping top panel integral with the top edge of said back panel, a front panel integral with the front edge of said top panel and the front edge of said bottom panel and having respectively top and bottom portions sloping inwardly toward said back panel and substantially contacting the same wherein the height of the back panel plus the width of the bottom panel equals the height of the front panel plus the width of the top panel to provide for folding flat said quadrilateral display sleeve in which said bottom portion of said front panel is arranged with openings therein extending from the front to the rear of said display sleeve and said upper rearwardly sloping portion of said front panel and said downwardly sloping top panel are arranged with openings substantially in alignment with said openings in said bottom portion of said front panel.

References Cited in the file of this patent

UNITED STATES PATENTS

| | | |
|---|---|---|
| 2,179,109 | Wheeler | Nov. 7, 1939 |
| 2,442,980 | Lewis | June 8, 1948 |
| 2,587,828 | Fogel | Mar. 4, 1952 |
| 2,959,276 | Srofe | Nov. 8, 1960 |

FOREIGN PATENTS

| | | |
|---|---|---|
| 665,455 | Germany | Sept. 26, 1938 |